United States Patent [19]

Tornabene

[11] 3,964,264
[45] June 22, 1976

[54] WAVE-ACTION UNDERSEA-DRILLING RIG
[76] Inventor: Michael G. Tornabene, c/o Amanda Machine Corp., 285 Oak Neck Lane, West Islip, N.Y. 11795
[22] Filed: Oct. 11, 1974
[21] Appl. No.: 514,004

Related U.S. Application Data
[63] Continuation-in-part of Ser. No. 457,075, April 1, 1974.

[52] U.S. Cl. .................................. 61/20; 24/114.5; 24/115 R; 60/398; 290/53; 294/1 R; 417/333
[51] Int. Cl.² ...................... E02B 9/00; F16G 11/00
[58] Field of Search .............. 61/20, 19, 63; 290/53, 290/42; 175/5; 173/53; 60/398, 495; 417/333; 294/1 R, 21; 24/114.5, 115 R

[56] References Cited
UNITED STATES PATENTS

| 610,378 | 9/1898 | Barthel | 61/20 X |
|---|---|---|---|
| 953,600 | 3/1910 | Edens | 417/333 |
| 1,396,580 | 11/1921 | Kilcullen | 417/333 |
| 1,811,565 | 6/1931 | Schwabacher | 290/42 |

Primary Examiner—Jacob Shapiro

[57] ABSTRACT

In a preferred embodiment, a clamping structure is mounted around a drilling-bit tube and is structured for permitting the clamping structure to rotate in counter-clockwise direction slidably around the drilling-bit tube and to permit the clamping structure to slide upwardly on the drilling-bit tube but to bring about a clamping and gripping of the drilling-bit tube whenever the clamping structure has clock-wise and/or downward force imparted thereto relative to a stationary state of the drilling-bit tube such that clockwise and/or downward force on the clamping structure serves to rotate the drilling tube in a clockwise direction and/or to press and move downwardly the drilling-bit tube, and intimate with the clamping structure there being an outer-cylindrical-surface structure having helical female grooves extending angularly downwardly in each of clockwise and counter-clockwise directions, and there being a circumscribing cylindrical tubular structure having radially-inwardly extending finger-projections shaped for having their respective distal inner ends ride slidably mateably within the helical female grooves such that upward and downward alternate movements of the cylindrical tubular structure imparts rotary motion to the outer-cylindrical-surface structure, and mounted intimately to and around the cylindrical tubular structure there being a spherically-shaped float having a large mass and defining in a substantially horizontal plane and extending around the periphery of the spherical shape thereof consecutive serially arranged uprightly-extending turbine-blade structures positioned and shaped such that water-current force on the turbine-blade structures imparts a clockwise motion to the float.

20 Claims, 38 Drawing Figures

WAVE-ACTION UNDERSEA-DRILLING RIG

This is a continuation-in-part of IMPROVED WAVE-ACTION POWER CONVERSION APPARATUS, Ser. No. 457,075 filed Apr. 1, 1974.

This invention relates to off-shore drilling with oil-drilling derricks, and the drilling rigs thereof.

BACKGROUND OF THE INVENTION

Prior to the present invention, it has been the accepted practice to utilize conventional motors and gearing connected therewith together with suitable additional clamping structure and elevator mechanisms for raising and lowering of clamped drill tubes and their bits and pipe being sunk into the drill hole. Use of conventional motors as well as the interconnected clamps and elevator systems and mechanisms have resulted in excessively high costs of setting-up and operation of oil drilling derricks, together with complicated and cumbersome structures and support required therefor.

SUMMARY OF THE INVENTION

Objects of the present invention include the overcoming and/or obviating of difficulties and disadvantages and problems of the types referred to above, together with obtaining other novel and/or desirable advantages and structures.

Another object is to utilize the energy of wave motion in the effecting of the drilling of an oil-hole in a drilling operation for undersea sites.

Another object is to obtain suitable apparatus for exerting to and fro upward and downward alternate motions of a float by a simple and inexpensive mechanism, to oil derrick drill tubes and bits.

Another object is to convert upward and downward alternate to and fro float action resulting from wave motion, to rotary-sinking of a drill tube and bit attached thereto through a sea bottom.

Another object is to obtain a rotary-motion and/or downwardly-directed force motion-mechanism automatically and simply upwardly advanceable axially along a drill tube being sunk by drilling through the sea bottom.

Another object is to obtain a modified float and drilling tube-connected clamping structure intimate therewith for imparting unidirectional rotary motion to each of the float and the drilling tube.

Other objects become apparent from the preceding and following disclosure.

One or more objects of the present invention are obtained by the invention as defined herein.

Broadly the invention includes a float structure mounted operatively in combination with a drill tube or casing to which the drill bit is normally attached, the interconnection of the float and the drill tube being such that alternate upward and downward to and fro wave-imparted motion of the float is converted to motion and force facilitatable of the drilling and sinking of a pipe in an undersea drilling operation. More particularly, the invention relates to on-the-site conversion of wave-motion to oil-derrick drilling-motion of either or both rotary and/or downwardly-impelling drill bit types. Particular preferred embodiments are directed toward imparting reciprocating upward and downward motion to the clamping mechanism utilizing a clamping mechanism which clamps or grips the pipe tubing or casing on the downward stroke thereby impelling the tubing or casing downwardly, while sliding upwardly on the pipe tube or casing on the upward stroke such that the pipe tube or casing is caused to sink deeper and deeper into the seabed, it being apparent that an integral part of the present invention comprises the utilization of a high predetermined degree of mass as a part of the float means or otherwise separate therefrom in the nature of a fly-wheel or its equivalent, such that the magnitude of force is sufficient for effecting the required degree of driving force required in a drilling operation. In another embodiment, there is provided appropriate interconnecting gearing structure to bring about the efficient conversion of the upward and downward reciprocating motion of the float to a rotary motion either of a reciprocating clock-wise and counter-clock-wise alternating motion, or in a preferred embodiment in solely a unidirectional driving motion by the incorporation of a slip-clutch arrangement or its equivalent.

In a still further preferred embodiment of the invention, both rotary, and upward and downward alternating motions are impartable to the clamping device while concurrently driving the clamped tube or casing preferably in a unidirectional rotary direction and preferably only downwardly while slipping in the alternate other rotary and upward opposite directions, such that the drill tube or casing is driven only in a single rotary direction and driven solely downwardly while concurrently the clamping device slips in the alternate rotary direction and the clamping device automatically moves upwardly relative to a stationary pipe tube or casing. In one version of this latter preferred embodiment, the float is mounted circumscribingly around the clamping device and the drill tube or casing, and automatically advances upwardly thereon intermediate between consecutive downwardly driving motions imparted to the tubing or casing. Also in a preferred embodiment of the invention, the float includes extending around its sides peripherally thereof outwardly-cupped turbine-blade elements engageable of water current for imparting unidirectional rotary motion to the float means around a perpendicular axially extending shaft or tube thereof.

The clamping mechanism of the present invention may be a separate element or a combination of elements and is preferably composed of several removably detachable composite parts locked together in its clamping state, and preferably separate from that of the float itself; however, in one preferred embodiment, the clamping means is interconnected with the float in such a manner that the upward movement of the float on the crest of a wave serves to automatically push, or pull, upwardly the clamping elements, mounted for upward sliding motion around the pipe tube or casing clamped thereby such that progressively the clamping elements obtain a higher grip on the pipe tubing or casing to be thereafter rotated and/or pressed downwardly.

It is to be understood that the optimum shape of the float depends upon the location of the drilling rig and the nature of the wave action at that location, together with the magnitude of force required for a particular drilling operation, as well as dependent on the extent and type of water currents prevalent. It is accordingly within the scope of the invention to utilize different shapes of floats such as square, rectangular, triangular, oblong, rectangular-cuboid, cubic, disc, spherical, and the like. Accordingly, attention is directed to the copending patent application entitled IMPROVED WAVE-ACTION POWER CONVERSION APPARA- TUS, Ser. No. 457,075, filed April 1, 1974, the entire disclosure thereof being hereby incorporated into this patent application as a part of this present disclosure, by incorporation by reference, this incorporated disclosure including particular advantages and shapes of different types of floats and masses associated therewith, in the conversion of wave energy to other types of energy.

In one of the preferred embodiments of the present invention, the gripping element permitting sliding in one direction and gripping in the other direction, includes bristles angled in one particular predetermined direction such that when the base on which the bristles are mounted moves in that direction in which the bristles extend, the base becomes gripped onto the surface against which the bristles' free ends are biased or pressing, whereas when the base is moved in the other direction, the bristles are merely slid smoothly along the surface in contact with the bristles' free ends. This gripping motion may be utilized for effecting one-way rotary motion by having the bristles directed angularly laterally from typically an inner surface of a cylindrical tube for engagement of the outer surface of a shaft or tube mounted therein, or alternatively may be directed angularly such that the base on which the bristles are mounted clamps against the tube or shaft whenever the bristles-mounted-base is moved downwardly to thereby result in a pressing downwardly on the grasped tube or casing or shaft. In a particular preferred embodiment of the invention, the bristles are directed both laterally and downwardly angularly such that the float on which the bristles are mounted within a vertical cylindrical tube of the float and with the tube mounted around the pipe tube or casing, serves to prevent the float from rotating the pipe in one direction or from forcing the pipe or casing upwardly, while on the other hand such an arrangement causes the bristle ends to grip in the opposite rotary and downward directions to thereby rotate the pipe tube or casing in a unidirectional direction rotatably and/or preferably concurrently press the pipe downwardly to sink the pipe tube or casing deeper into the sea bottom by virtue of the rotary motion imparted to the pipe tube or casing as well as the downward force imparted thereto, as a result of the large mass and inertia thereof of the float in its working stroke in the downward descending motion of the float between consecutive wave crests in the valleys thereof.

The invention may be better understood by making reference to the Figures as follow.

THE FIGURES

FIGS. 2 through 15 illustrate other varying shapes in similar views thereof, whereas

DETAILED DESCRIPTION OF THE INVENTION

Figure 1:
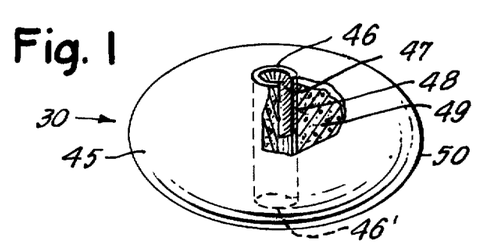
FIG. 1 illustrates one of possible varying shapes of floats embodying the present invention, in perspective side top view.

FIG. 1 through FIG. 15 illustrate diagrammatic views of typical possible variations in outer shapes of float-clamping devices of the present invention. In particular, it is contemplated that in use of these devices that the bore therethrough extends vertically such that the unidirectional clamping action thereof is effective either upon the rise of the float with wave action, or alternately if the device is inverted, upon the descent of the float, the rising float having a downwardly directed clamp serving to slip during the ascent and to clamp and drive downwardly a pipe or pile or other object around which the device is mounted through the bore thereof. Alternately, if inverted such that the clamps are facing upwardly for engagement during ascent, the device may be utilized for slipping during non-engagement during descent and for engaging and withdrawing a pipe or pile from its sea-bottom sunk or driven state within the mud or earth as the clamps lock during the floating ascent of the float with a rising upper water surface. Accordingly, FIG. 1 illustrates a typical substantially spherical but somewhat elliptical float having a bore conduit therethrough with a preferred clamping device of the present invention as can be viewed in the partial cut-away as downwardly directed bristles which are adapted to slide upwardly on the shaft or pipe as the float moves upwardly, but to become engaged in non-sliding relationship on the shaft as the float moves downwardly relative to a stationary position of the shaft or tube. The FIG. 1 device 30 includes the float structure 50 having upper bore opening 46 and lower bore opening phantom as lower bore opening 46' and the shell 45 with the communicating bore conduit 48 extending in a sealed fashion between the bore openings 46 and 46'. Within the conduit space of the bore structure 48 there are mounted radially inwardly and downwardly directed typically substantially semi-rigid steel or alloy bristles 47. The bristles 47 by being radially inwardly directed and downwardly directed, serve to permit a sliding of the device 30 upwardly on a fixed shaft or tube but to bring about a clamping of the bristles onto the shaft or pipe upon attempted downward movement of the device 30 on the shaft or pipe such that the weight of the device 30 serves to drive downwardly the shaft or pipe, the shaft or pipe not being illustrated in this illustration.

Figure 2:
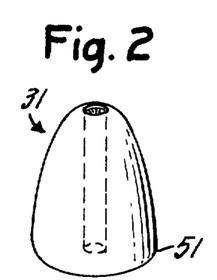
Figure 3:
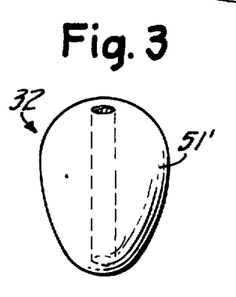
Figure 14:
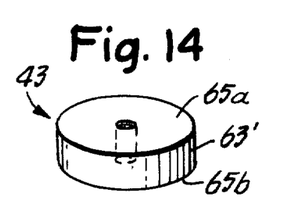
Figure 15:
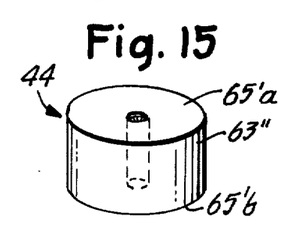

For each of FIGS. 2 through 15, there may be a similar type of clamping mechanism or alternately any equivalent clamping device examples of which shall be illustrated as typical hereafter. Thus, FIG. 2 illustrates a clamping device combination 31 of an egg-shape, with an enlarged base and a narrowing conical upper portion of the shell of float 51. FIG. 3 illustrates an embodiment 32 in which the base is conically shaped with an enlarged upper portion. The device in embodiment 33 illustrates a fully spherical float 52. The FIG. 5 embodiment 34 illustrates opposite end conical shapes with enlarged mid-portion of the float 53. The FIG. 6 embodiment 35 illustrates a different type of variation, namely a cube having a cube-sided float 54 with right-angled corners 55. The FIG. 7 embodiment 56 has a float basically the same as embodiment 54 except that the embodiment 56 is of reduced height for the side walls. In contrast, the FIG. 8 embodiment 37 has extended height of the shell 57 side walls as compared to the embodiment 54. The FIG. 9 embodiment 38 corresponds substantially to that of the embodiment 37 except for being of triangular cross-section for the top 58 having acute angles 59 at each of the respective corners, the acute angles thus being angles of less than 90°. The FIG. 10 embodiment 39 corresponds to substantially the embodiment 34, except for being more greatly elongated in its float 53' and having flattened upper and bottom surfaces 60 adjacent the bore openings thereof. The embodiment of FIG. 11 float 40 has the enlarged flattened upper surface 61 and the small flat surface 61' of the float 62 of basically fully conical shape. The FIG. 12 embodiment 41, illustrates a cylindrical float 63 with upper and lower flattened surfaces 63a and 63b. The FIG. 13 embodiment 42 corresponds substantially to the embodiment 34 except for having the upper and lower flattened surfaces 64 and 64' of the float 53''. FIG. 14 embodiment 43 illustrates a shortened-height cylindrical float 63' having upper and lower flattened surfaces 65 and 65'. FIG. 15 embodiment 44 illustrates an intermediate-height cylindrical float 63'' having upper and lower flattened surfaces 65'a and 65'b.

Figure 4:
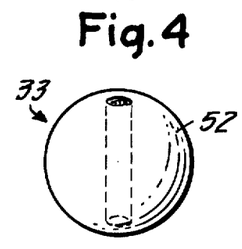
Figure 5:
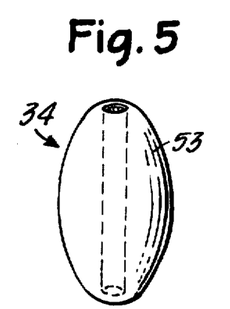
Figure 6:
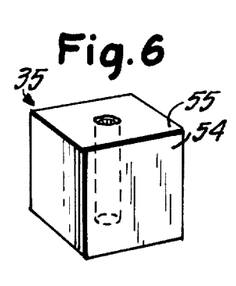
Figure 7:
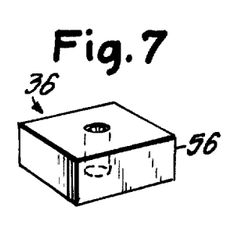
Figure 8:
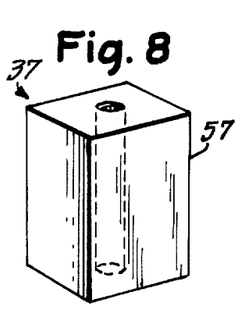
Figure 9:
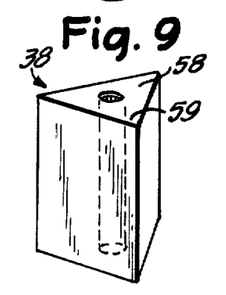
Figure 10:
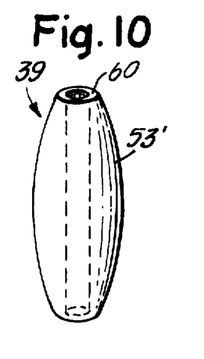
Figure 11:
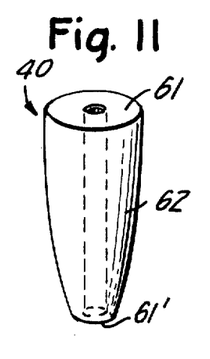
Figure 12:
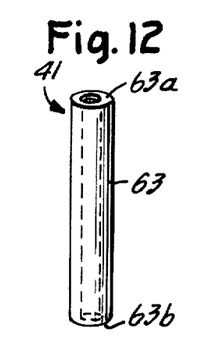
Figure 13:
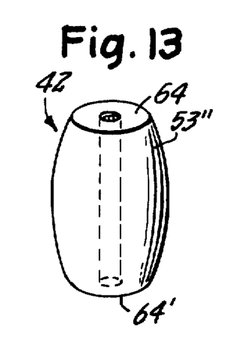
Figures 16, 17, 18, 19:
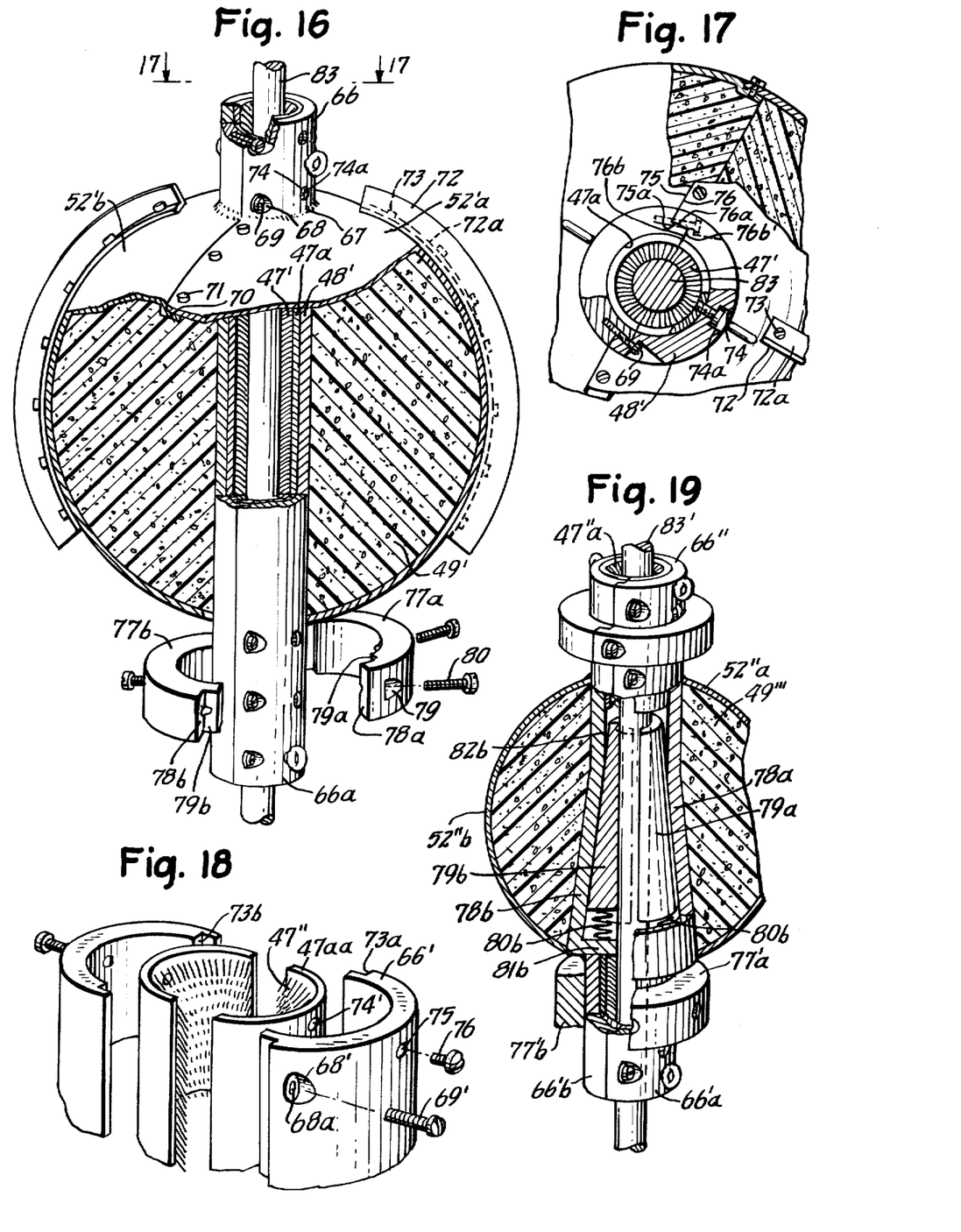
FIG. 16 illustrates a partially assembled typical embodiment in side perspective top view with partial cut-away in cross-section for various components thereof.
FIG. 17 illustrates a view of the embodiment of FIG. 16 in an in-part view in partial cross-section as taken along lines 17—17 thereof of FIG. 16.
FIG. 18 illustrates a slip-clamp combination of the present invention which may be mounted in association with a separate float, illustrated in exploded side top perspective view.
FIG. 19 illustrates a side top perspective in partial cut-away and cross-sectional illustration of various components thereof of another alternate embodiment of the invention.

The FIG. 16 discloses an embodiment 33 of the FIG. 4 configuration in particular disclosing a preferred embodiment with radially inwardly and downwardly extending semi-flexible bristles 47' pressing engagingly in contact with shaft 83 such that as the float including outer shell halves 52'a and 52'b float upwardly together with the intimate inner cylindrical passage structure 48' the cylindrical inner passage structure 47a snugly mounted within the passage structure 48' and carrying on its inner surface the flexible bristles 47' is moved upwardly therewith relative to a stationary shaft 83 because of the downwardly slanting radially inwardly directed bristles 47' sliding nonengagingly upon the surface of the shaft 83.

When the float moves downwardly with the tide and/or wave action in which it is floated in conventional use, the semi-rigid bristles 47' become engaged and locked downwardly against the shaft 83 to press and force downwardly shaft 83.

The upper neck structure 66 and the lower neck structure 66a are intimate with the sheet structure 52'a, for example the neck structure 66 being fused or welded at fusion point 67. Accordingly the neck opposing half-portions and the shell halves 52'a and 52'b are fastened together typically by screws and bolts 69 extending into recesses 68 with the edge of one of the shell halves such as shell half 52'a overlapping a downwardly-stepped edge 70 of shell half 52'b and secured by screws or bolts 71. Typically also there may be water current-engageable downwardly-extending flanges such as flange 72 mounted by a horizontal portion shown in phantom for the shell half 52'a as mounting flange 72a by the bolts shown in phantom as bolts 73. The inner cylindrical structure 47a is typically secured in its mounted state within the cylindrical structure 48' by screws or bolts 74a extending into screw or bolt holes 74.

FIG. 17 as taken along lines 17—17 of FIG. 16, also being in partial cut-away, as well as in cross-section through the shaft 83 shows additional features such as the intermeshing faces of the respective opposing halves of the neck structure 66 as flush faces 76b and 76'b and flush stepped faces 75a and 76a and flush faces of the shell as flush faces 75 and 75 respectively. The relationship and positioning of the screws 69 are further shown as well as the locking screws or bolts 74a and the screw depressions 74.

FIG. 16 discloses an optional but preferred bilateral mounting ring for adding mass, including right and left halves 77a and 77b engageable with one-another with typically locking screws 80 within recess space 79 and the aperture of space 78b and its inner flange 79b, with the face 78a and inner face 79a.

FIG. 18 illustrates a variation on the present invention, in which a collar of the type described immediately above for FIG. 15, includes an inner mountable cylindrical clamp of the type described above as cylinder structures 47' except that this particular clamping structure 47aa being secured by bolts 76 within apertures 74' and 75'. Accordingly, the embodiment of FIG. 18 may be utilized with a conventional float mounted slidably in both directions around the shaft, such as for example shaft 83 of FIG. 16, with the result that the weight of the downwardly moving float presses downwardly on the upper surface 66' to cause the downwardly directed bristles 47'' to engage upon a shaft or pipe mounted therewithin. FIG. 19 illustrates a further embodiment in which the neck structure portion 66'' is intimate with the float shell half 52''a and includes the bristles 47''a directed downwardly as well as this embodiment including a conically shaped inner cavity structure 79a and 79b, halves structures mounted enclosed therewithin around the shaft 83' as bilateral wedge-clamp structures 79a and 79b each biased upwardly by springs 80a and 80b such that the wedge-clamps 79a and 79b become lockingly engaged around the shaft 83' whenever the float moves downwardly relative to a stationary position of the shaft 83' to thereby drive the shaft 83' downwardly. There is a correspondingly lower neck structure with neck halves 66'a and 66'b as well as mounted therearound a collar having halves 77'a and 77'b. The spring 80b, for example, is seated on the horizontal radially inwardly extending base structure 81b, on an upper face thereof.

Figure 20:
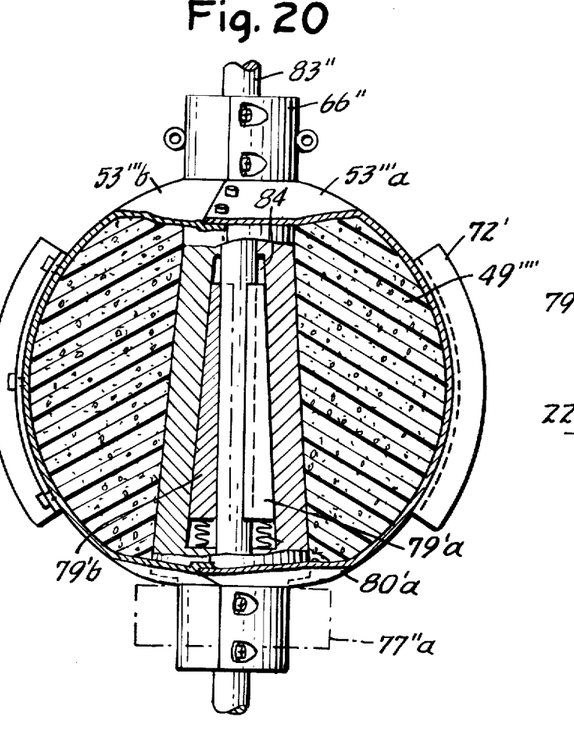
FIG. 20 illustrates another alternate embodiment in side elevation plan view with partial cut-away and cross-sectional illustration of various components thereof, this embodiment being a variation on that disclosed in FIG. 19.

FIG. 20 illustrates an embodiment as a variation on that of the embodiment of FIG 19, for example in which the conical shaped inner space 84 and the positioning of the wedge structures 79'a and 79'b and the biasing spring such as spring 80'a, are somewhat differently arranged. As with prior embodiments, there is the closed celled foam 49'''' within the shell structure halves 53'''a and 53'''b. Other structure substantially corresponds to prior described embodiments.

Figure 21:
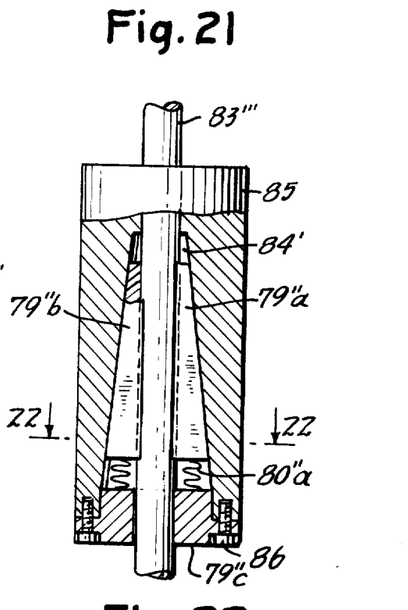
FIG. 21 illustrates an alternate variation to the embodiment of FIG. 18, illustrating in side elevation view various components thereof of a separate clamping device that may be used in association with a separate float.

FIG. 21 illustrates a variation on the embodiment of FIG. 20, in that the clamp device of FIG. 21 is separate from and distinct from any float, this particular device comparing as analagous in its function to the device of FIG. 18, and functions by the same mechanism, such that it may be slid upwardly on the central pipe or shaft 33''' and in like manner the pipe or shaft 33''' may be moved downwardly therethrough slidably, but on the other hand any attempt to move the device downwardly on the pipe or shaft 33''' results in a driving longitudinally-axially downwardly the pipe or shaft 33'''. The device of FIG. 21 includes the wedge members 79''a, 79''b, and 79''c, and as viewed in cross-section in FIG. 22, 79''d, acting within space 84 as biased upwardly by the springs 80''a, and the like, for the respective wedge members. The body of the structure 85 defining the space 84' constitutes a sizable amount of mass such that a rising float mounted around a pipe or shaft 33'' ' with the float beneath the device of FIG. 21, serves to slide the device of FIG. 21 upwardly around the pipe or shaft 33''', and as the wave recedes, the large mass of the device 85 serves to drive downwardly the pipe or shaft 33'''as the clamps above-noted clamp thereonto. The base 79''c is removable by removal of bolts 86.

Figures 22, 24, 25:
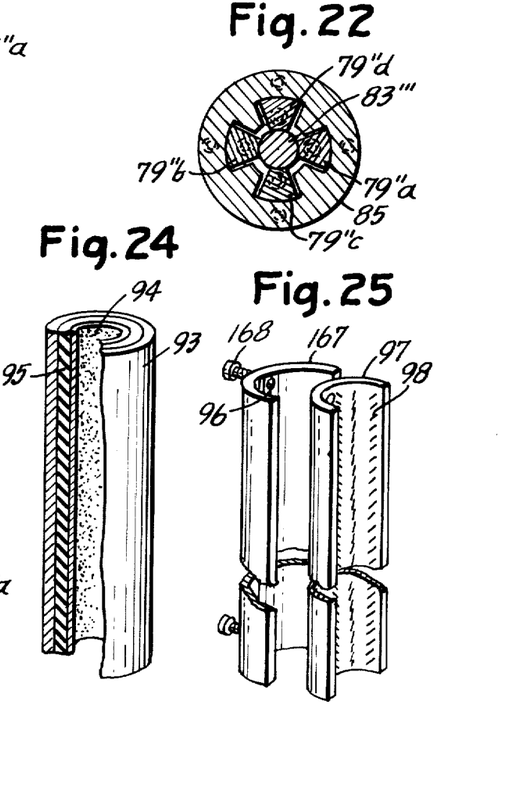
FIG. 22 illustrates a view of cross-section as taken along lines 22—22 of the FIG. 1 embodiment.
FIG. 24 illustrates in perspective top side cut-away view a variation of the present invention as an insert of a sanding device.
FIG. 25 illustrates half of a bilateral insert sections, of a sanding device, shown in partial cut-away in top side perspective view.

It should be additionally noted that the wedge members 79''a and 79''b and 79''c and 79''d as is clearly ascertainable in FIG. 22, are each within its respective recess and each is shaped such that the forward wedge face is engageable with the pipe or shaft 83''' as biased upwardly by the respective springs acting on the bases of the wedge members, but that the mouth of each wedge member's respective recess is of a width smaller than the back width of the wedge member itself, such that when the pipe or shaft 83''' is withdrawn, the wedge members will not fall radially inwardly.

Figure 23:
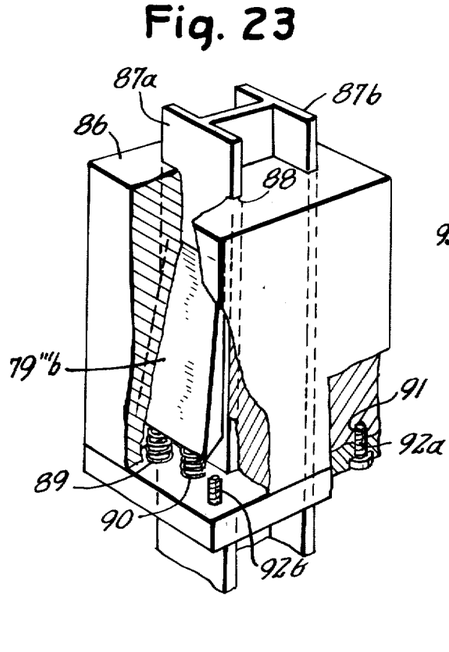
FIG. 23 illustrates an alternate embodiment as a variation on the FIG. 21 embodiment, utilizable in association with a separate float, illustrated in top side view in partial cut-away.

FIG. 23 illustrates a clamping device which is basically the same in principle as that of FIG. 21 except that the embodiment of FIG. 23 illustrates a variation and typifies the principle thereof is applicable to other types of structures such as I-beams having upper and lower flanges 87a and 87b respectively against which are clampable the respective clamps of which in cut-away clamp 79'''b is illustrated, this clamp also having a a narrow forward face and a broadened back and being within its respective recess having a narrowed forward opening such that as in the embodiment of FIG. 21, in also this embodiment of FIG. 23 the clamp 79'''b will not fall forwardly in the absence of an I-beam flange 87a, but never the less does lean sufficiently forwardly as to engage an I clamp flange to clamp thereagainst in one direction and to permit slipping in the other direction, as with the prior-discussed clamps of the same mechanism. This structure is illustrated as having a square body 86 but is not necessarily square, and the body has defined therein the I-shaped slots extending as through-passages therethrough for receipt of the I-beam flanges and body therethrough. As in the embodiment of FIG. 21, the embodiment of FIG. 23 also has a removable bottom that on its upper surface supports the springs such as 89 and 90 and is removable by removal or screws or bolts 92a, 92b, and the like, set within the female threaded recess 91, for example.

FIG. 24 illustrates a still other alternate embodiment of the present invention in which a device comparable to those of FIGS. 21 and 23, for example would be used typically in conjunction with the float thereunder and upward and downward movement of a float slidably around a pipe or shaft would press upwardly the device of FIG. 24 and permit it to slide downwardly as the float decends with the effect that the sandpaper or other abrasive face-surface 94 pressed biasingly inwardly by rubber backing 95 causes the surface of the pipe or shaft to be sandpapered or otherwise abraded by the face-surface 94.

FIG. 25 illustrates half of an entire embodiment comparable to that of FIG. 24 and with the illustrated half section being shown in exploded view and in partial cut-away, this particular device having directly-radially-extending bristles which are not slanted downwardly nor sidewardly but strictly horizontally radially inwardly in order that there is no clamping action irrespectively as to whether the device is moving upwardly or downwardly and/or revolving with the float, but such that by the directly-radially-inwardly directed bristles 98 mounted on the structure 97 there is accomplished a wire-brushing of the pipe or shaft mounted abrasively thereagainst, with a float being mounted beneath this device in operation such that as the float rises around the pipe or shaft the device of FIG. 25 in its entirety would move upwardly with the float and as the float descends the device would move downwardly, resulting in brushing or abrasive action in each of upward and downward movement of the device.

Figure 26:
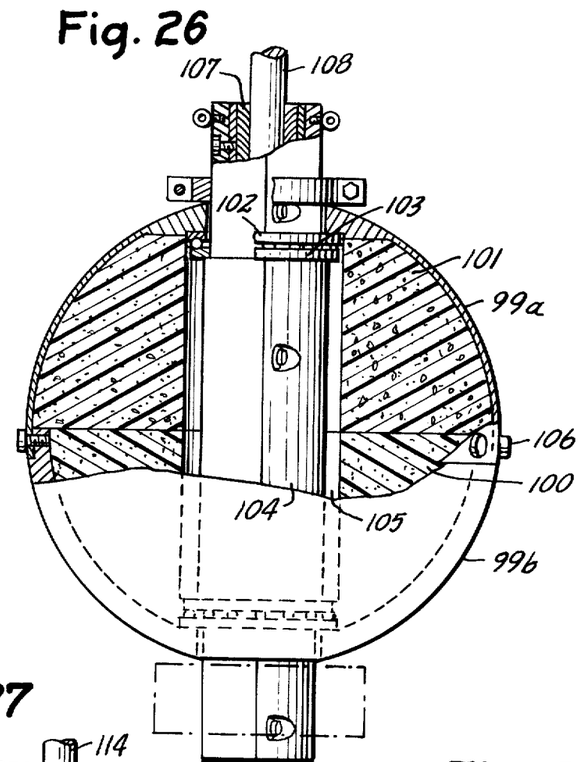
FIG. 26 illustrates an elevation plan view in partial cut-away of a still other alternate embodiment.

FIG. 26 illustrates a float clamp embodiment of the present invention in a variation having upper and lower halves of a float sphere with excessive mass in the lower half by virtue of the outer wall, but the major distinction as compared for example to that of FIGS. 16 and 20 in that float structure 99a is freely revolvable in each of clockwise and counter-clockwise directions around the clamp structure 104 having its downwardly directed bristles engaged on the pipe or shaft 108 for downward driving thereof, but with the float 99a upper-half and lower-half 99b being freely revolvable around the clamp structure 104, with the upper and lower halves 99a and 99b being mated and secured by overlapping wall structure secured by bolts 106, and having as in other embodiments the foam of closed cell variety therein. There is defined through the foam 100 the through-space cylindrically shaped, 105, having the small cylindrical clamp structure 104 mounted therein with ball bearings on the structure 103 serving to support the structure 104 of the upper and lower halves 99a and 99b.

The bilateral halves of the clamping structure 104 are secured together typically by bolts 101.

Figure 27:
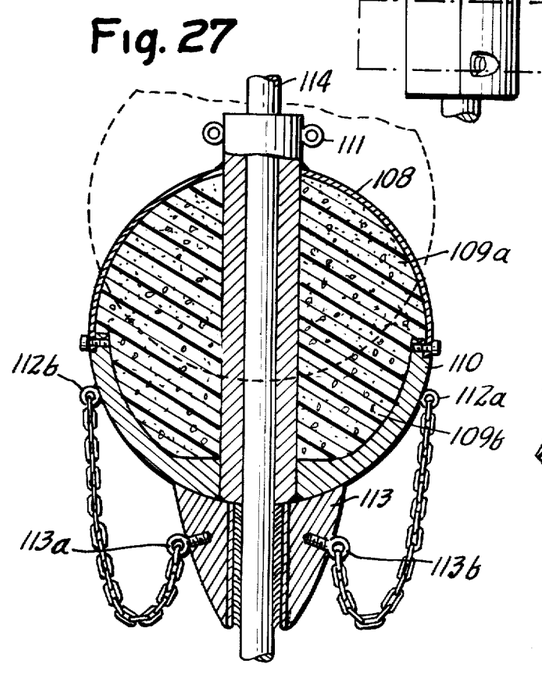
FIG. 27 illustrates a still other alternate embodiment in elevation plan view in partial cut-away.

FIG. 27 illustrates an embodiment in which a float is mounted slidably around a pipe or shaft 114, the float being identified as upper and lower shells 108 and 110, the lower shell having the thickened massive walls for enhancing the effect of inertia in the driving force for driving downwardly the pipe or shaft 114, but the separate clamp device 113 secured thereto by anchoring rings 112a and 112b typically and the chains thereof attached to rings 113a and 113b respectively for the lifting slidably upwardly of the clamping device 113 as the float is moved upwardly by wave action, slidably around the pipe or shaft 114, and the float becoming seated as illustrated as the wave recedes in order that its entire weight as well as the weight of the clamping structure 113 jointly serve to drive downwardly the pipe or shaft 114.

Figure 28:
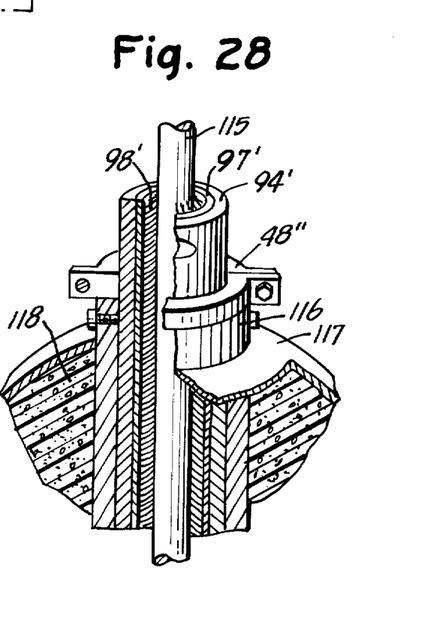
FIG. 28 illustrates a perspective top side view in an in-part view with partial cut-away of a still other alternate embodiment.
Figures 29, 30, 31:
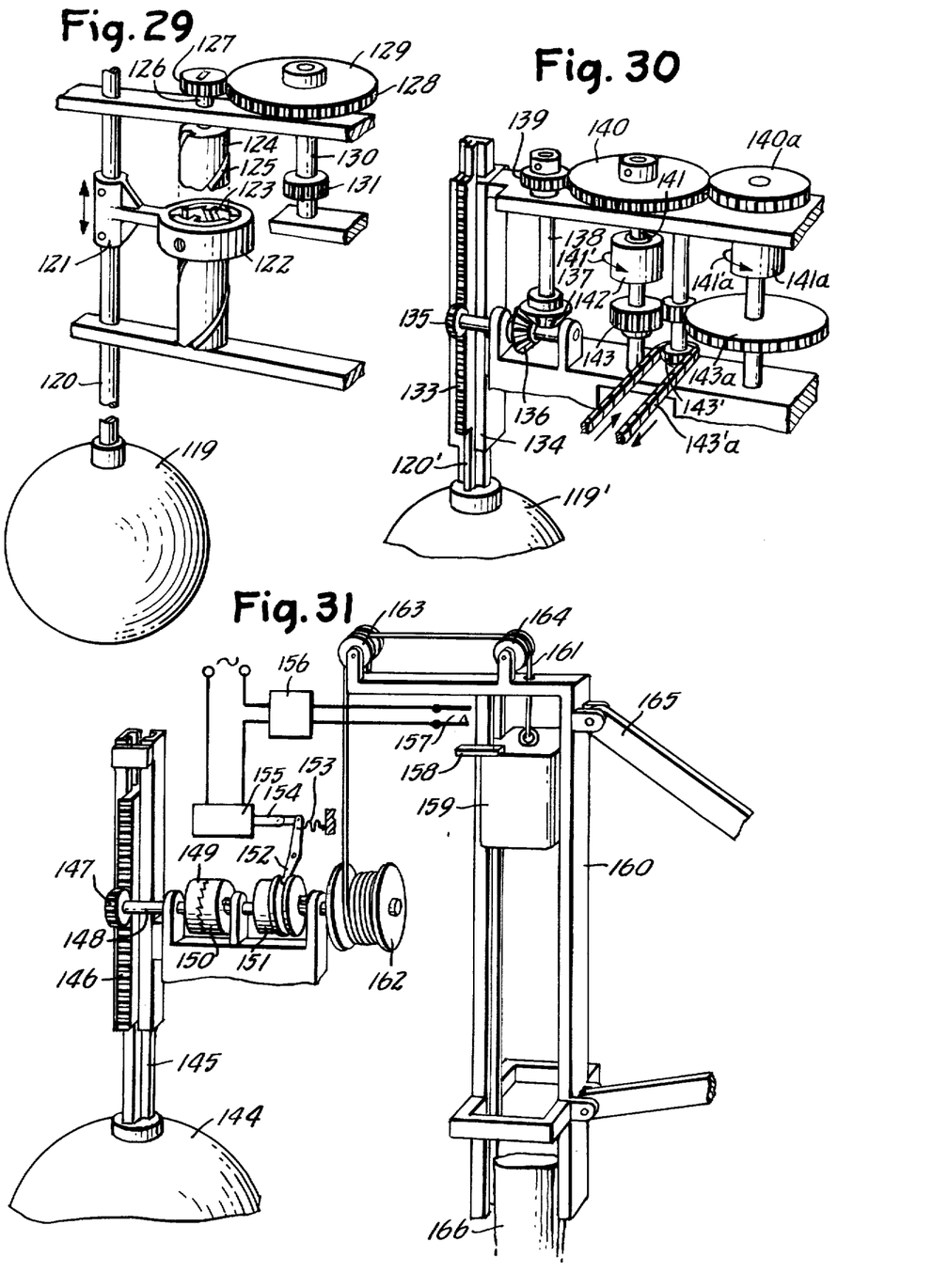
FIG. 29 illustrates an alternate variation employing intermediate gearing and associated slip-clutch assemblage as an alternate embodiment of the present invention, shown in side top perspective view.
FIG. 30 illustrates a perspective view similar to that of FIG. 29, of a still other alternate typical gearing and slip-clutch embodiment.
FIG. 31 illustrates a still other typical gearing and clutch brake embodiment utilized in a greater inventive combination as a pile driving embodiment, in top side perspective view and in an in-part view thereof.

FIG. 28 illustrates an alternate embodiment typically comparable to that of FIG. 16, for example, the main feature being illustrated in this embodiment being that the locking bristles 98' mounted on the support 97' are directed upwardly such that as wave action moves downwardly the float and the clamping device 94' moves downwardly slidably around the pipe or shaft 115 and such that upon the rising of the wave or tide the clamping device 94' with its upwardly radially inwardly-directed bristles 98' serve to drive upwardly the pipe or shaft 115 to thereby withdraw and/or remove a sunk or driven pipe or shaft from its sunk or drilled state within the bottom of the sea. Collar 116 includes the clamping securing structures 48" mounted above the shell 117 of the float having closed cell rubber or foam 118 therein. FIG. 29 illustrates in an in part view and in perspective view thereof a variation on the present invention, illustrating a float suitable for movement upwardly and downwardly with wave action whereby the upward and downward motion is by the male threads 123 of the ring 122 secured by the mounting structure 121 onto the upright shaft 120, imparted to the cylindrical member 124 shown in partial cutaway having female grooves 125 in which the male threads 123 ride with the upward and downward movement of the float 119 whereby the gear 127 mounted on the shaft 126 is rotated to and fro in clockwise and counter-clockwise directions alternately and imparts its motion to the slip-clutch gear 129 having its teeth 128 engaged with the teeth of gear 127, such that motion of shaft 130 is intermittently imparted in one of clockwise or counter-clockwise directions and such that the gear 131 drives intermittently, the selected direction depending upon which direction the slip-clutch has been installed for driving and alternately for slipping.

FIG. 30 illustrate a somewhat analagous variation with the float 119' having upright shaft 120 including a ratchet with teeth 133 engageable and revolvable of the gear 135 for the turning of the gear 136 which by bevel gear arrangement imparts motion to bevel gear 137 to rotate shaft 138 and the toothed gear 139 which in turn rotates the toothed gear 142 by way of the disk 142 and its slip-clutch 141, such that the gear 143 is moved in a counter-clock-wise direction drivably to drive the toothed wheel of the drive shaft in a clockwise direction together with the drive chain mounted thereon identified as chain 143'a. Such driving would be intermittent except for the gear 140a engaged with the toothed gear 140 which drives a slip-clutch gear 141a in a counter-clockwise direction 141'a whereby the tooth gear 143 drives the drive shaft gear 143' in a clockwise direction, with the result that the driving of the drive shaft gear 143' and the drive chain 143'a is a continuous drive.

FIG. 31 illustrates a still other variation of the present invention for intermittent driving and reserving of energy and release of that energy intermittently. In particular, there is typically represented as an example a float 144 on an upright shaft 145 having a ratchet gear 146 acting on toothed gear 147 to rotate a drive shaft 148 through slip-clutch gears 149 and 150 and through clutch 151 for engaging and disengaging drive of the spool 162, the clutch 151 being activated and deactivated by action of lever 152 pivoted, and spring-biased by spring 153 around its pivot point, as actuated by lever 154 of electromagnet 155 by way of time-delay switch 156 upon a closing of the contacts 157 by pressure of the key 158 as the massive weight and pile-driving member 159 is raised on its cable 161 around pulley 164 and 163 as the spool 162 is wound by the rotary action imparted from the toothed gear 147. The time-delay switch 156 serves to actuate the electromagnet 155 in order to disengage the clutch 151 and accordingly disengage drive of the spool 162 thereby permitting the spool 162 to unwind whereby the driving weight 159 falls against its pile 166 as guided by the guide rails 160, to drive the pile into the sea bottom by virtue of the wave action motion harnessed hereby. The time-delay switch 156 maintains the closed circuit for a predetermined time sufficient for the weight member driving weight 159 to impact the pile 166 before the time-delay switch 156 breaks circuit whereby the electromagnet is deactivated to bring about an engagement of drive by a closing of the clutch 151 for the next consecutive cranking of the spool 16a. The slip-clutch gears 149 and 150 have the teeth angled such that there is drive in one direction of rotation and slipping in the other direction one relative to the other as the shaft 148 is revolved. Accordingly, in the illustrated direction of the slanted teeth, the gear 150 will be driven as the float 144 rises, but the gear 149 will slip on the gear 150 as the float 144 descends with wave action. As in the embodiment of FIG. 30, it is within the scope of the invention to utilize parallel arrangement of gears with respective slip-clutches to thereby obtain a continuous action from the alternating motion of the gear 147.

Figures 32, 32A, 32B:
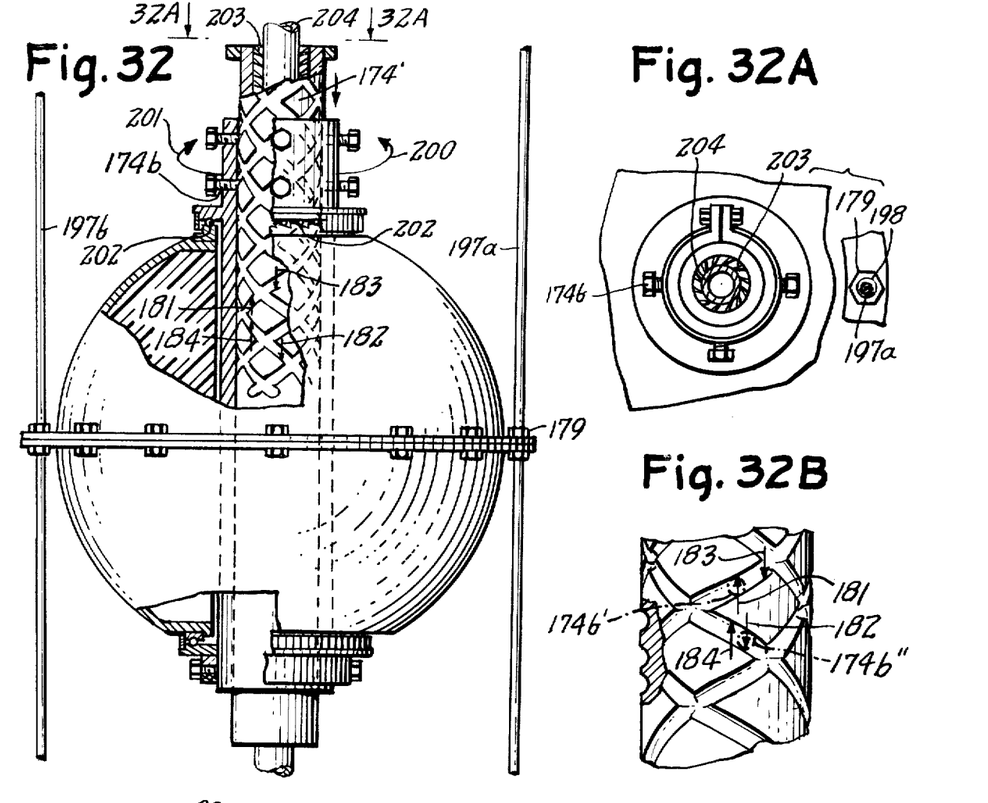
FIG. 32 illustrates a still other alternate embodiment shown in perspective side top exploded view in partial cut-away.
FIG. 32A illustrates a cross-sectional view as taken along lines 32A—32A of FIG. 32.
FIG. 32B illustrates a cross-sectional view as taken along lines 32B—32B of FIG. 32.

FIG. 32, 32A and 32B illustrate an embodiment of the invention similar in principle to that of the driving mechanism of the FIG. 29 embodiment in that the upward and downward reciprocal motion of the float serves to impart rotary motion to the clamping device typically of the type of clamping device of FIG. 16, but the float being mounted on slip clutch bearings such that as the float moves in a counter-clockwise direction it drives the clamping device in that counter-clockwise direction and as shown in FIG. 32 in-part view and in cross-sectional view, the clamping bristles are directed radially inwardly in a counter-clockwise direction such that when the clamping base on which they are mounted moves in a counter-clockwise direction. The motion is imparted to the clamping device by virtue of adjustable pins 174b slidably ridable in the grooves 174b' on the outer surface 174' of the clamping device, for example pressure of such pins in the direction 182 and 183 shown by the arrows with pressure at points such as 174b'' serves to move the clamping device in a counter-clockwise direction 200 whereas pressure in directions 181 and 184 at points such as 174'b serves to move the clamping device in a clockwise direction 201. When the float moves in a clockwise direction, the slip-bearings 202 disengage to permit free clockwise rotation of the float around the main cylindrical structure, and similarly if the clockwise rotation were to be imparted to the clamping structure by a more conventional other float, devoid of the herein-illustrated clutch-bearings, the clamping device never-the-less would slip in the clockwise direction because of the FIG. 32A radially inwardly counter-clockwise-directed bristles 203 thereby permitting the clamping structure to slip when moved in a clockwise direction around the pipe or shaft 204. It will become readily apparent that when utilizing this type of clamping structure, there is no real need for the incorporating of the illustrated FIG. 32 slip bearing mechanism, and alternatively when such slip-bearing mechanism is employed, there is no real necessity for a slippable clamping structure of the type herein illustrated, except as a precaution in the event that one or the other might become jammed. It should be further noted as is illustrated in the FIG. 32 cut-away portion, that the clamping bristles 203 are directed downwardly and radially inwardly from the mounting base of the bristles such that as the float moves upwardly the entire clamping structure slides upwardly on the pipe or shaft and as the float moves downwardly as with receding wave action, the clamp engages the pipe or shaft to drive it downwardly as into the sea bottom.

Figure 33:
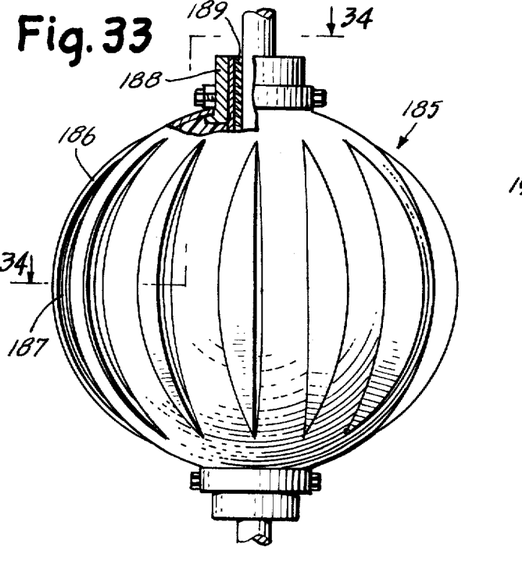
FIG. 33 illustrates a perspective top-side view of an alternate embodiment.
Figure 34:
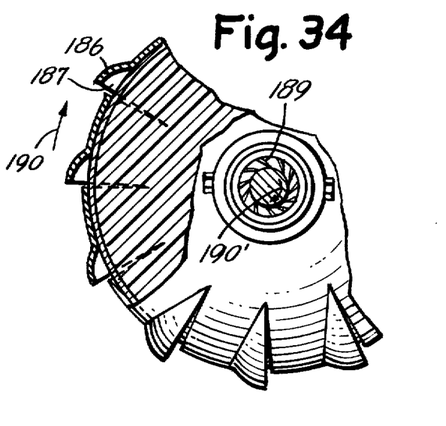
FIG. 34 is a cross-section thereof.

FIGS. 33 and 34 illustrate an embodiment substantially the same as that of FIG. 16, except having cups 186 extending from top to bottom thereof in the nature of turbine flanges such that water currents circulating around the float serve to drive the float in a clockwise direction, and as viewed in FIG. 34, that clockwise direction serves to rotate the pipe or shaft also in a clockwise direction 190 as a result of the clamping bristles 189 being directed in a clockwise direction as shown in FIG. 34 as well as being directed downwardly in direction as shown in FIG. 33 whereby clockwise movement of the float as well as downward movement with wave action, of the float, serves to drive the pipe.

Figure 35:
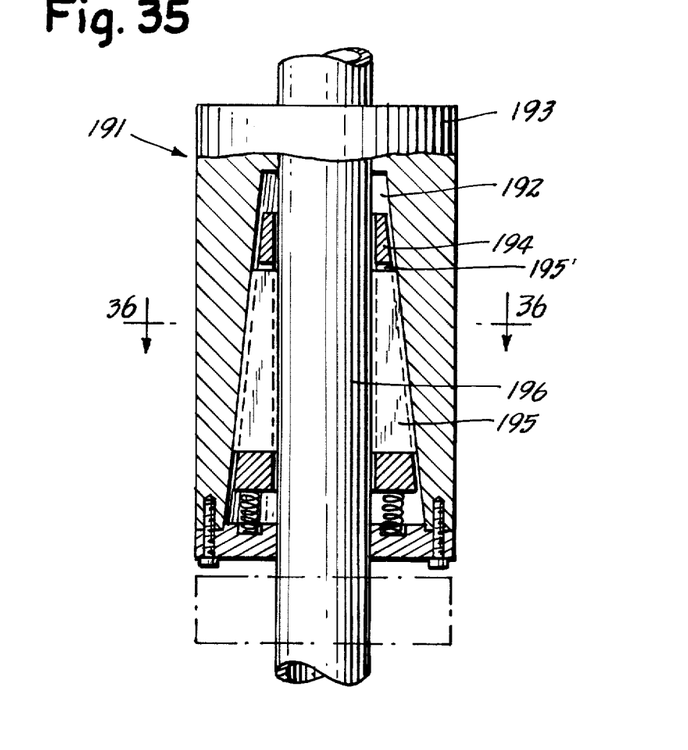
FIGS. 35 and 36 are side and cross-section views of a clamp.
Figure 36:
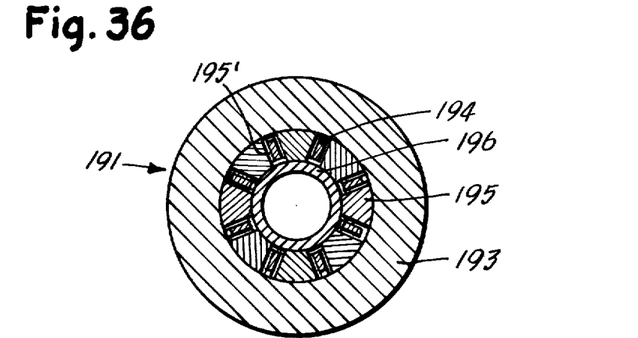

FIG. 35 illustrates an alternate embodiment to that typically of FIG. 21, there additionally being mounted within the recess space 192 a sleeve 194 movable axially upwardly and downwardly and having slots 195' therein in which slots the clamping members 195 are mounted with the springs 80''a one or more biasing upwardly on the sleeve 194 itself, and with the clamps riding with the sleeve as mounted within the slots thereof, upward movement of the main body member serving to slide the clamping members along the pipe 196, whereas downward movement of the body member results in upward wedging of the sleeve-mounted clamp members 195 pressing wedgingly against the rearward faces of the clamping members to clamp the forward faces of the clamping members clampingly against the walls of the pipe to thereby drive consecutively the same downwardly. Such a clamping structure is mountable by the same general mechanism as that of the FIG. 21 embodiment, or alternately by the connectors of that of the FIG. 27 embodiment. FIG. 36 is a cross-sectional view along lines 36—36 of FIG. 35, illustrating the elements noted in FIG. 35.

With further reference to FIGS. 35 and 36, the clamping device 191 has the main casing 193 as the structure defining the main conical recess 192.

It is within the scope of the present invention to make such variations and modifications as would be apparent to a person of ordinary skill in this art, including the substitution of obvious equivalents to those illustrated as mere examples of typical and preferred embodiments of the invention.

I claim:

1. A wave-action device comprising in combination: a clamp means for intermittently drivably engaging and for thereby transmitting force in a first predetermined direction to a drivable element when engaged with the clamp means, and for intermittently disengaging from engagement with the drivable element during movement of the clamp means in an opposite second direction relative said first direction; float means for effecting an intermittent force to the clamp means being adapted to have predetermined size and mass and buoyancy arranged such that wave-action initiated momentum thereof is sufficient to effect the intermittent force and such that the float means is maintained substantially at water surface level.

2. A wave-action device of claim 1, including a slip-action means for intermittently transmitting the intermittent force in said first predetermined direction from said float means to said clamp means, said slip-action means being adapted for effecting said engaging and said disengaging.

3. A wave-action drilling device of claim 1, in which the float means includes radially outwardly extending flanges of shapes adapted to intercept water currents such that rotary motion of the float means is imparted to said clamp means to thereby rotate the clamp means.

4. A wave-action device of claim 2, in which the slip-action means includes intermeshing male and female gear structures positioned in predetermined positions relative to one-another adapted thereby such that reciprocating substantially upright motion is convertable to substantially horizontal motion of the clamp means.

5. A wave-action device of claim 2, in which the slipaction means is mounted in operative association with the float means intimately connected thereto; and upright lever shaft means mounted for axial upward and downward to and fro motion, the slip-action means being mounted on the upright lever shaft means such that the float means and the slip-action means move in the first predetermined direction relative to the upright lever shaft means whenever wave action is moving the float means in an upright direction.

6. A wave-action drilling device of claim 3, in which the slip-action means defines therethrough an upright conduit and in which the inner surface of the conduit includes directed semi-rigid bristle elements directed in a second direction and substantially radially inwardly such that movement in said second direction of the slip-action means serves to clamp onto and force a lever shaft means extending therethrough slidably in said second direction, whenever wave-action causes the float to move in said second direction.

7. A wave-action device of claim 2, in which the drill clamp means includes lockably-attachable removable segments locked into a unitary structure such that a conduit space is defined therethrough.

8. A wave-action device of claim 7, in which for downward driving a drivable member, the slip-action means defines therethrough an upright conduit with the clamp means mounted within the upright conduit such that said drivable member is downwardly drivable upon downward movement of the float means.

9. A wave-action device of claim 4, in which one of the male and female gear structures is substantially helical in shape of threads thereof, and the other of the male and female gear structures is adapted to follow the helical threads, such that substantially vertical motion of the one is converted to the substantially horizontal rotary motion for the other.

10. A wave-action device of claim 9, in which the substantially horizontal rotary motion-other structure defines a central tubular conduit space therethrough extending substantially axially uprightly therethrough, having a circumscribing inner periphery of an inner shape such that a substantially flushly mounted slidable element mounted therein is non-rotatably slidable therein non-rotatably relative to the horizontal rotary motion-other structure.

11. A wave-action device of claim 2, in which the slip-action means includes a slip-clutch structure and levers interconnected to convert to and fro reciprocal motion of the float means to upward and downward motion of the clamp means, said clamp means comprising a beam guide adapted to hold erectly a beam to be driven downwardly, and a driving member for imparting force downwardly onto a top of the beam.

12. A wave-action drilling device of claim 3, in which the flanges are substantially cup-shaped defining turbine-like rotary-wheel recesses, with the cup-shaped flanges directed in a direction such that intercepted water currents in one direction drive the float means rotatably around a substantially upright axis, and the float means being connected with the clamp means such that the rotary force is impartable to an attached drill bit.

13. A wave-action drilling device of claim 4, in which said inner periphery includes structure of a predetermined shape adapted such that a substantially flushly mounted element extending therethrough is prevented from sliding upwardly therethrough.

14. A wave-action device of claim 13, and a substantially uprightly-extending drive shaft element substantially snugly extending through the space of the inner periphery.

15. A wave-action device of claim 1, including a drill means for effecting drilling responsive to driving torque transmitted from said clamp means, and being detachably connected to the clamp means.

16. A wave-action device of claim 7, in which for driving a drivable member, the slip-action means defines therethrough an upright conduit with the clamp means mounted within the upright conduit such that said drivable member is drivable upon movement of the float means.

17. A wave-action device comprising in combination: float means of predetermined size and mass and buoyancy such that wave-action-initiated momentum thereof is sufficient for effecting an abrading force; and an abrading means for frictionally transmitting rubbing and abrading force to and for abrading a predetermined surface when contacted, said abrading means being connected to said float means for driving the abrading means.

18. A wave-action device of claim 17, in which said abrading means includes a structure extending substantially lineally in on plane and in which the structure in the lineally extending plane defines a surface including abrading elements thereon, the abrading means being operatively mounted for reciprocating action to and fro along the lineally extending plane responsive to the abrading force of to and fro motion of said float means responsive to wave action.

19. A wave-action device comprising in combination: a drill means for effecting drilling; float means of predetermined size and mass and buoyancy such that wave-action initiated momentum thereof is sufficient for effecting a drilling force when a drill element is operatively connected; a drill clamp means for intermittently drivably connecting said float means to and driving the drill means and for transmitting force from the float means to the drill means; a slip-action means for imparting force in a downwardly-driving-effecting direction only when preselected for solely that direction for imparting force, said drill clamp means being intimate with the slip-action means operatively interconnecting the float means and the drill means, adapted for imparting drilling force and movement to the drill means in response to upward and downward motion of the float means during reciprocal wave action on the float means upwardly and downwardly, said slip-action means being mounted in operative association with the float means intimately connected thereto; upright lever means mounted for axial upward and downward to and fro motion, the slip action means being mounted on the upright lever shaft means adapted such that the float means and the slip-action means move in a first direction relative to the upright lever shaft means whenever wave action is moving the float means in an upward direction, the slip-action means defining therethrough an upright conduit and the inner surface of the conduit including directed semi-rigid bristle elements directed in a second direction and substantially radially inwardly such that movement in said second direction of the slip-action means serves to clamp onto and force a lever shaft means extending therethrough slidably into said second direction, whenever wave-action causes the float to move in said second direction.

20. A wave-action device comprising in combination: a drill means for effecting drilling; float means of predetermined size and mass and buoyancy such that wave-action initiated momentum thereof is sufficient for effecting a drilling force when a drill element is operatively attached; for intermittently drivably connecting said float means to and driving the drill means, a drill clamp means additionally for transmitting force from the float means to the drill means; a slip action means for imparting force in a downwardly driving-effecting direction only when preselected for solely that direction for imparting force, said drill clamp means including a slip-action means operatively inerconnecting the float means and the drill means, adapted for imparting drilling force and movement to the drill means in response to upward and downward motion of the float means during reciprocal wave action on the float means upwardly and downwardly, said slip-action means including intermeshing male and female gear structures adapted to convert reciprocating substantially upright motion of the float means to substantially horizontal motion of the drill means, one of the male and female gear structures being substantially helical in shape of threads thereof, and the other of the male and female structures being adapted to follow the helical threads such that substantially vertical motion of the one is converted to the substantially rotary motion of the other, the substantially horizontal rotary motion-other structure defining a central tubular conduit space therethrough extending substantially axially upwardly therethrough, having a substantially circumscribing inner periphery of an inner shape such that a substantially flushly mounted slidable element mounted therein is non-rotatably slidable therein non-rotatably relative to the horizontal rotary motion-other structure.

* * * * *